(12) United States Patent
Fanning

(10) Patent No.: US 12,173,462 B2
(45) Date of Patent: Dec. 24, 2024

(54) DUST MITIGATION SYSTEM

(71) Applicant: Fanca Technologies Pty Ltd, Queensland (AU)

(72) Inventor: Andrew Fanning, Queensland (AU)

(73) Assignee: Fanca Technologies Pty Ltd, Queensland (AU)

( * ) Notice: Subject to any disclaimer, the term of this patent is extended or adjusted under 35 U.S.C. 154(b) by 182 days.

(21) Appl. No.: 17/673,887

(22) Filed: Feb. 17, 2022

(65) Prior Publication Data

US 2023/0066089 A1 Mar. 2, 2023

(30) Foreign Application Priority Data

Aug. 24, 2021 (AU) .............................. 2021106746

(51) Int. Cl.
*E01H 1/08* (2006.01)
*B01D 46/00* (2022.01)
*B01D 46/16* (2006.01)
*B01D 46/24* (2006.01)
*B01D 46/76* (2022.01)

(52) U.S. Cl.
CPC ....... *E01H 1/0845* (2013.01); *B01D 46/0005* (2013.01); *B01D 46/0043* (2013.01); *B01D 46/16* (2013.01); *B01D 46/2403* (2013.01); *B01D 46/76* (2022.01); *B01D 2267/40* (2013.01); *B01D 2271/02* (2013.01); *B01D 2273/30* (2013.01); *B01D 2279/40* (2013.01)

(58) Field of Classification Search
None
See application file for complete search history.

(56) References Cited

U.S. PATENT DOCUMENTS

| | | | | |
|---|---|---|---|---|
| 4,787,923 | A | * | 11/1988 | Fleigle ...................... A47L 9/20 55/497 |
| 2009/0300870 | A1 | * | 12/2009 | Riach .................... A47L 9/1608 134/21 |
| 2014/0026352 | A1 | * | 1/2014 | Ulrich ................... E01H 1/0845 15/340.4 |
| 2022/0090820 | A1 | * | 3/2022 | Gulliksen .............. B01D 46/26 |

* cited by examiner

*Primary Examiner* — Mikhail Kornakov
*Assistant Examiner* — Pradhuman Parihar
(74) *Attorney, Agent, or Firm* — Fresh IP PLC; Clifford D. Hyra; Aubrey Y. Chen

(57) ABSTRACT

A dust mitigation system for a mobile sweeper, the dust mitigation system including a cover to at least partially cover one or more brushes of the mobile sweeper, a dust collector including at least one fan and one or more filters, and at least one duct fluidly connecting the cover with the dust collector.

17 Claims, 8 Drawing Sheets

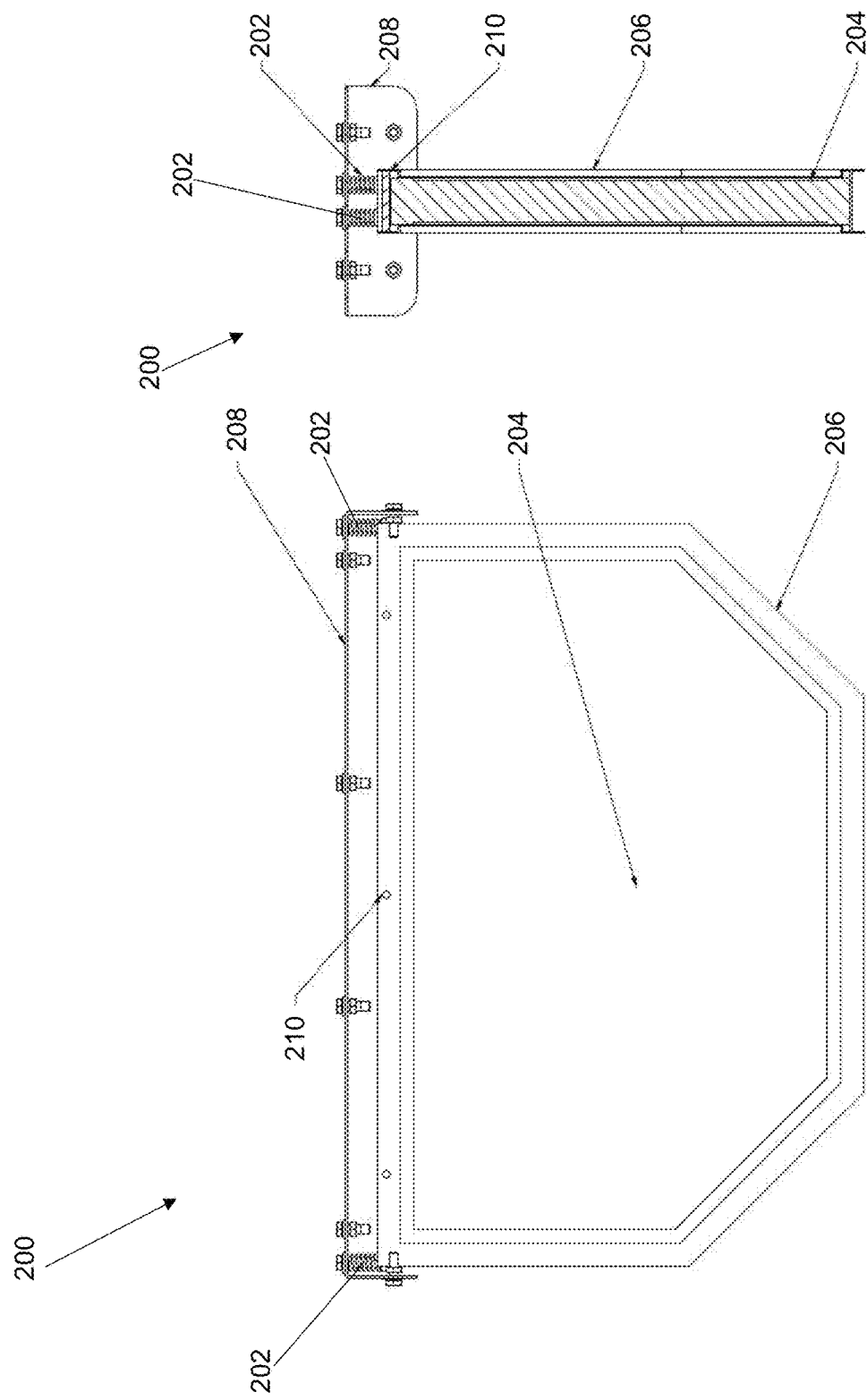

DUST MITIGATION SYSTEM

CROSS REFERENCE TO RELATED APPLICATION

This application claims the priority filing benefit of Australian Patent Application No. 2021106746 filed on Aug. 24, 2021, which is incorporated herein by reference in its entirety.

FIELD OF INVENTION

The present invention relates to a dust mitigation system. The present invention has particular but not exclusive application for a dust mitigation system for a mobile sweeper. Reference will be made in the specification to use of the invention with a mobile sweeper. This use is by way of example only and the invention is not limited to this use.

BACKGROUND OF THE INVENTION

Mobile sweeper systems are used to remove dust and other particulates from a ground surface. Removing dust and other particulates is important as excess exposure to dust and particulates can cause illness and damage to lungs. Large worksites, roads and industrial premises that produce dust and other particulates usually use mobile sweepers to reduce the dust and other particulates and debris.

Mobile sweepers are effective at cleaning large areas.

A problem with some mobile sweepers is that the sweeping action can cause dust to be thrown into the air.

One way to reduce the amount of dust that is thrown into the air is to provide a vacuum adjacent to where the sweeping is taking place.

A problem with providing a vacuum is that this typically adds a sizable load to the mobile sweeper due to the size of the fan required to produce the vacuum, and due to the number of filters required to filter the dust from the air.

Increasing the load typically increases the size of the mobile sweeper required.

OBJECT OF THE INVENTION

It is an object of the present invention to overcome or at least alleviate one or more of the above mentioned problems with mobile sweeper systems and/or provide the consumer with a useful or commercial choice.

SUMMARY OF THE INVENTION

In one aspect the present invention broadly resides in a dust mitigation system for a mobile sweeper, the dust mitigation system including
   a cover to at least partially cover one or more brushes of the mobile sweeper;
   a dust collector including:
      at least one fan; and
      one or more filters; and
   at least one duct fluidly connecting the cover with the dust collector.

Preferably the dust mitigation system further includes at least one separator. Preferably the at least one separator is located between the at least one duct and the one or more filters. Preferably the dust mitigation system includes a separator for each duct. Preferably the at least one duct is two ducts and the dust mitigation system includes two separators.

Preferably each separator includes one or more blades to move air through the separator. Preferably each separator includes a motor to drive the one or more blades. Preferably the motor is an electric motor. Preferably the one or more blades are attached to a shaft. Preferably the shaft is rotatably mounted to an inlet of the separator. Preferably the shaft is rotatably mounted to the inlet of the separator by a bearing. Preferably the motor drives the shaft. Preferably each separator includes a clutch to disengage the one or more blades relative to the motor. Preferably the clutch is a magnetic clutch. In another embodiment, the motor is adapted to act as a clutch, enabling the one or more blades to spin without powering the motor. Preferably the clutch is adapted to disengage when the at least one fan is running at an operational speed.

Preferably each separator includes a pre-filter. Preferably the pre-filter is located at least partially around the one or more blades. Preferably the pre-filter has a plurality of openings to enable dust and particles below a predetermined size to pass through the plurality of openings. Preferably the pre-filter has an exhaust aperture for larger particles to exit the pre-filter. Preferably the larger particles are at or above the predetermined size. Preferably the exhaust aperture is directed away from the one or more filters. Preferably the pre-filter is tapered from an inlet of the pre-filter to the exhaust aperture. Preferably the pre-filter is substantially conical in shape. Preferably the pre-filter is mounted to a portion of the separator by one or more resilient or elastic members. Preferably the one or more resilient or elastic members are adapted to enable movement during operation to shake the pre-filter to dislodge any dust or debris that may be stuck in or blocking the plurality of openings. Preferably the pre-filter is mounted to a portion of the separator by one or more springs. Preferably the pre-filter is mounted to an inlet of the separator by one or more springs. Preferably the one or more springs are adapted to enable movement during operation to shake the pre-filter to dislodge any dust or debris that may be stuck in or blocking the plurality of openings.

Preferably each separator includes an impact protection cone. Preferably the impact protection cone protects the motor from incoming dust and debris. Preferably the impact protection cone protects the clutch from incoming dust and debris. Preferably the impact protection cone protects the bearing from incoming dust and debris.

Preferably each of the one or more filters is a panel filter. Preferably the one or more filters are mounted to a part of the dust collector. Preferably the one or more filters are removably mounted to a part of the dust collector. Preferably each of the one or more filters are mounted to a part of the dust collector by one or more resilient or elastic members. Preferably the one or more resilient or elastic members are adapted to enable movement during operation to shake the filter to dislodge any dust or debris that may be stuck in or blocking the filter. Preferably each of the one or more filters are mounted to a part of the dust collector by one or more springs. Preferably the one or more springs are adapted to enable movement during operation to shake the filter to dislodge any dust or debris that may be stuck in or blocking the filter. Preferably each of the one or more filters includes one or more seals. Preferably the one or more seals seal against a portion of the dust collector to ensure that the air passes through the filter. Preferably each of the one or more filters includes a filter frame located around the filter. Preferably the one or more seals are located on a surface of the filter frame. Preferably the one or more filters is a single filter. In one embodiment the one or more filters are activated carbon panel filters Preferably the dust collector includes one or more cover plates. Preferably the one or more cover plates are movable or removable such that the one or more filters can be removed from the dust collector.

Preferably the dust collector includes a hopper. Preferably the hopper is adapted to hold the settled dust and debris. Preferably the dust collector includes a sensor to sense the level of dust and/or debris in the hopper. Preferably the dust mitigation system includes a means to indicate when the level of dust and/or debris in the hopper has reach a predetermined level. Preferably the dust mitigation system includes a light to indicate when the level of dust and/or debris in the hopper has reach a predetermined level.

Preferably the dust collector includes a discharge outlet to enable dust and/or debris in the hopper to be removed. Preferably the discharge outlet is a slide gate.

Preferably the cover is mounted relative to the one or more brushes of the mobile sweeper.

Preferably the fan is a twin stage fan. Preferably the fan is powered by an electric or hydraulic motor. Preferably the fan can run in reverse to clean the one or more filters.

Preferably the dust mitigation system further includes one or more batteries. Preferably the one or more batteries are adapted to at least partially power the dust mitigation system.

Preferably the dust mitigation system further includes one or more solar panels. Preferably the one or more solar panels are adapted to charge to one or more batteries.

Preferably the dust mitigation system further includes a motion sensor. Preferably the motion sensor is adapted to detect movement of the mobile sweeper. Preferably if forward motion is detected, the motion sensor is adapted to turn on the dust mitigation system.

Preferably the dust mitigation system further includes a support frame to attach to the mobile sweeper.

Preferably the dust mitigation system further includes the mobile sweeper. Preferably the mobile sweeper is a wheeled vehicle. Preferably the mobile sweeper is a skid steer vehicle. Preferably the mobile sweeper has one or more arms to move the cover between an active position in which the cover is adjacent a ground surface and an inactive position in which the cover is lifted away from a ground surface. Preferably the at least one duct includes one or more flexible portions or movable joints to enable the cover to be moved between the active and inactive positions.

In another aspect the present invention broadly resides in a mobile sweeper including a dust mitigation system as described in this specification.

In a further aspect the present invention broadly resides in a method of filtering air, including the steps of:
 sweeping a ground surface with a mobile sweeper;
 moving air with swept dust and/or debris through at least one separator having a pre-filter to separate different sized dust and/or debris; and
 moving the air through a filter to filter the air; and
 shaking the pre-filter and the filter to dislodge dust and/or debris such that the dust and debris can fall into a hopper.

Preferably the mobile sweeper is a mobile sweeper as described in this specification.

Preferably the air is moved by at least one fan. Preferably the at least one separator includes one or more blades to move air through the separator.

In another aspect the present invention broadly resides in a separator for separating dust and/or debris from air, the separator including:
 a one or more blades to move air through the separator;
 a pre-filter located at least partially around the one or more blades, the pre-filter having a plurality of openings to enable dust and/or debris below a predetermined size to pass through the plurality of openings, and an exhaust aperture for larger particles to exit the pre-filter, the pre-filter tapered from an inlet of the pre-filter to the exhaust aperture,
 wherein the pre-filter is mounted to a portion of the separator by one or more resilient or elastic members adapted to enable movement during operation of the separator to shake the pre-filter to dislodge any dust or debris that may be stuck in or blocking the plurality of openings.

Preferably each separator includes a motor to drive the one or more blades. Preferably the motor is an electric motor. Preferably the one or more blades are attached to a shaft. Preferably the shaft is rotatably mounted to an inlet of the separator. Preferably the shaft is rotatably mounted to the inlet of the separator by a bearing. Preferably the motor drives the shaft. Preferably each separator includes a clutch to disengage the one or more blades relative to the motor. Preferably the clutch is a magnetic clutch. In another embodiment, the motor is adapted to act as a clutch, enabling the one or more blades to spin without powering the motor. Preferably the clutch is adapted to disengage when the at least one fan is running at an operational speed.

Preferably the pre-filter is substantially conical in shape. Preferably the pre-filter is mounted to an inlet of the separator by the one or more resilient or elastic members. Preferably the one or more resilient or elastic members are one or more springs.

Preferably each separator includes an impact protection cone. Preferably the impact protection cone protects the motor from incoming dust and debris. Preferably the impact protection cone protects the clutch from incoming dust and debris. Preferably the impact protection cone protects the bearing from incoming dust and debris.

Preferably the separator is for a dust mitigation system as described in this specification.

In a further aspect, the present invention broadly resides in a panel filter for filtering dust or debris from air, the panel filter having
 a filter;
 a frame surrounding the filter;
 one or more resilient or elastic members to mount the frame to a dust collector,
 wherein the one or more resilient or elastic members are adapted to enable movement during operation of the dust collector to shake the filter to dislodge any dust or debris that may be stuck in or blocking the filter.

Preferably the one or more resilient or elastic members are one or more springs. Preferably the one or more springs are adapted to enable movement during operation to shake the filter to dislodge any dust or debris that may be stuck in or blocking the filter. Preferably each of the one or more filters includes one or more seals. Preferably the one or more seals seal against a portion of the dust collector to ensure that the air passes through the filter. Preferably the one or more seals are attached to the filter frame. Preferably the one or more seals are located on a surface of the filter frame. In one embodiment the filters is an activated carbon panel filter.

The features described with respect to one aspect also apply where applicable to all other aspects of the invention.

Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein:

FIG. 9 is a front view of the panel filter of FIG. 6; and

FIG. 10 is a sectioned view of the panel filter of FIG. 6.

DETAILED DESCRIPTION OF THE PREFERRED EMBODIMENT

Figure 1:
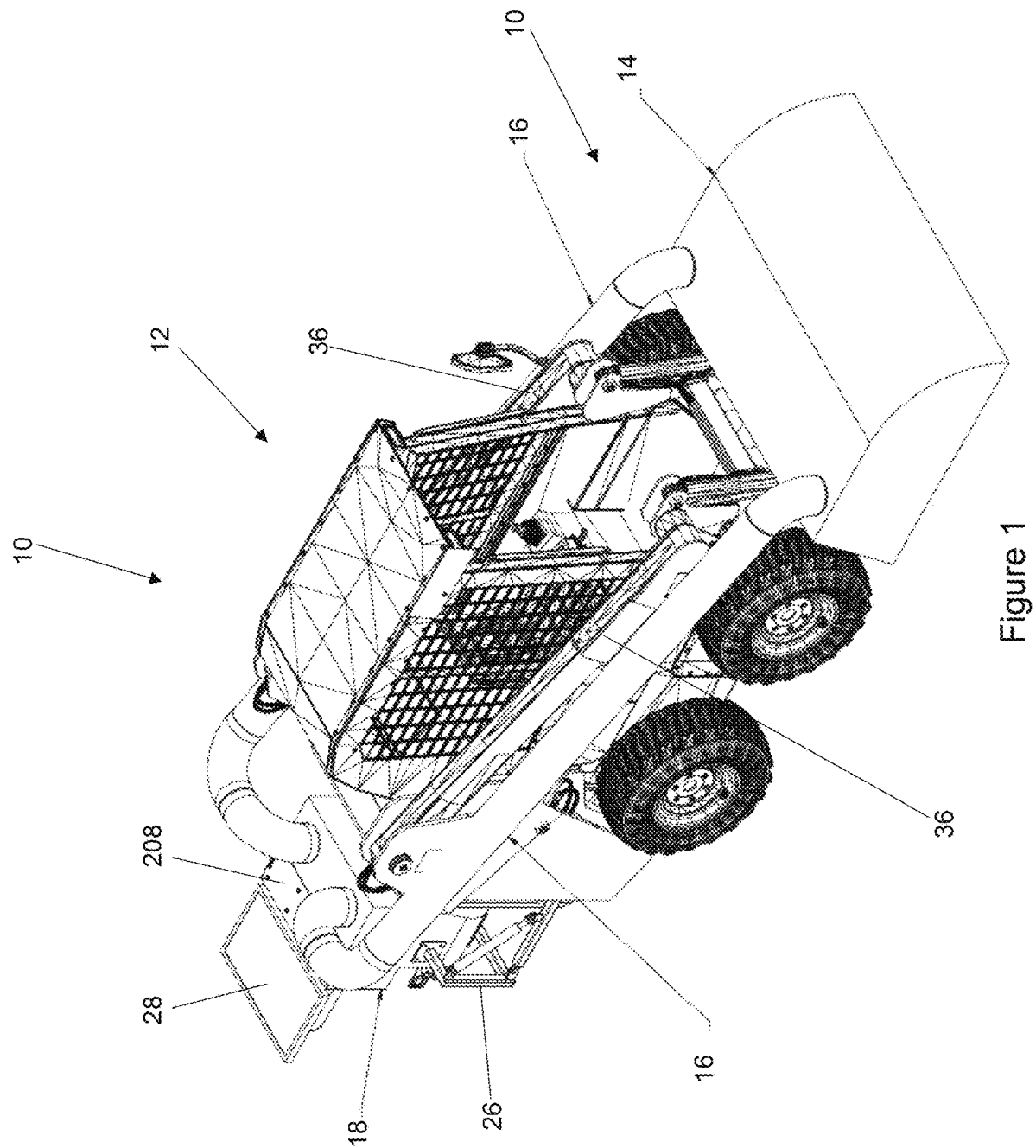
FIG. 1 is an isometric front view of a mobile dust sweeper with a dust mitigation system according to an embodiment of the present invention.
Figure 2:
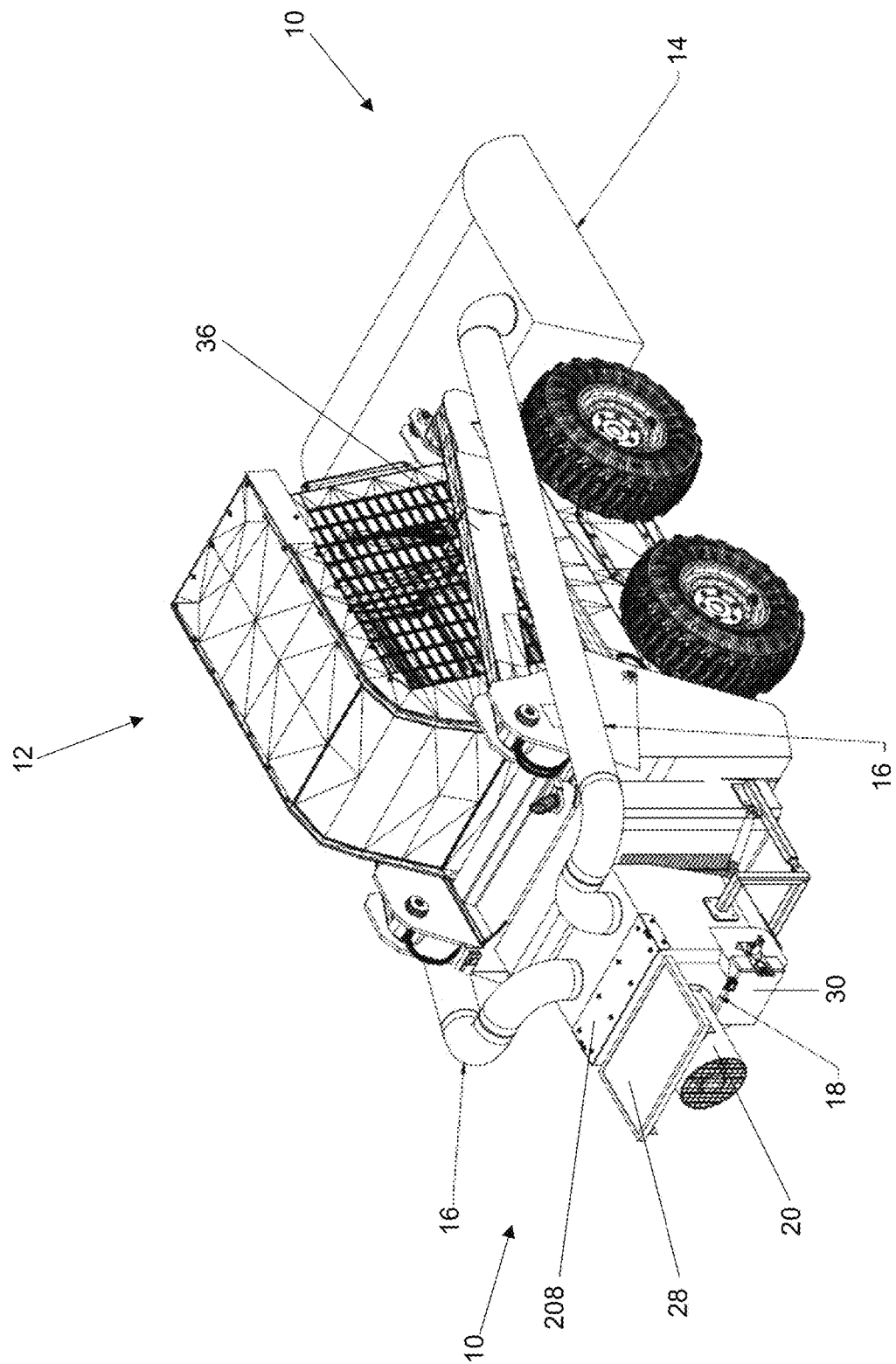
FIG. 2 is an isometric rear view of the mobile dust sweeper of FIG. 1.
Figure 3:
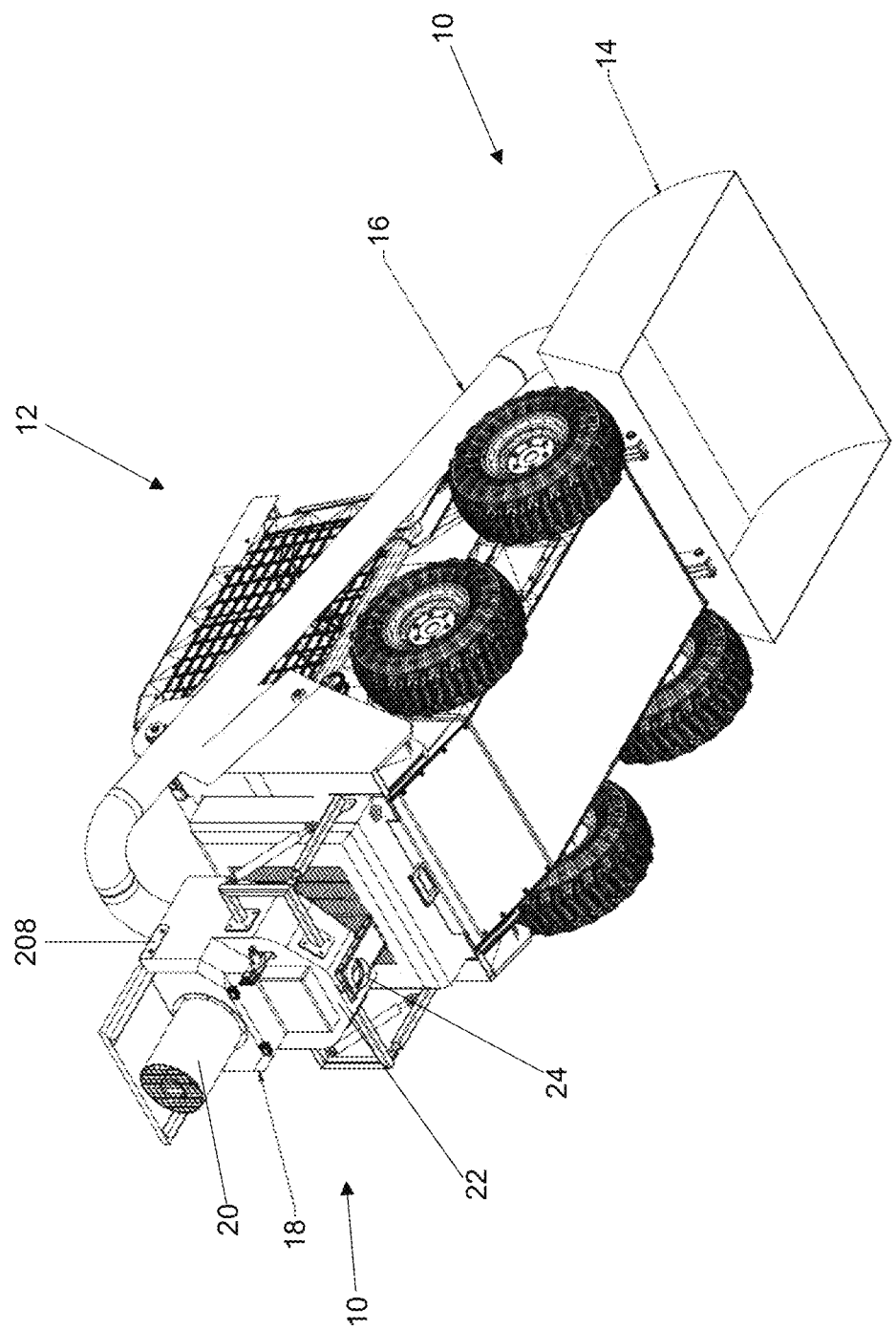
FIG. 3 is a lower rear isometric view of the mobile dust sweeper of FIG. 1.
Figure 4:
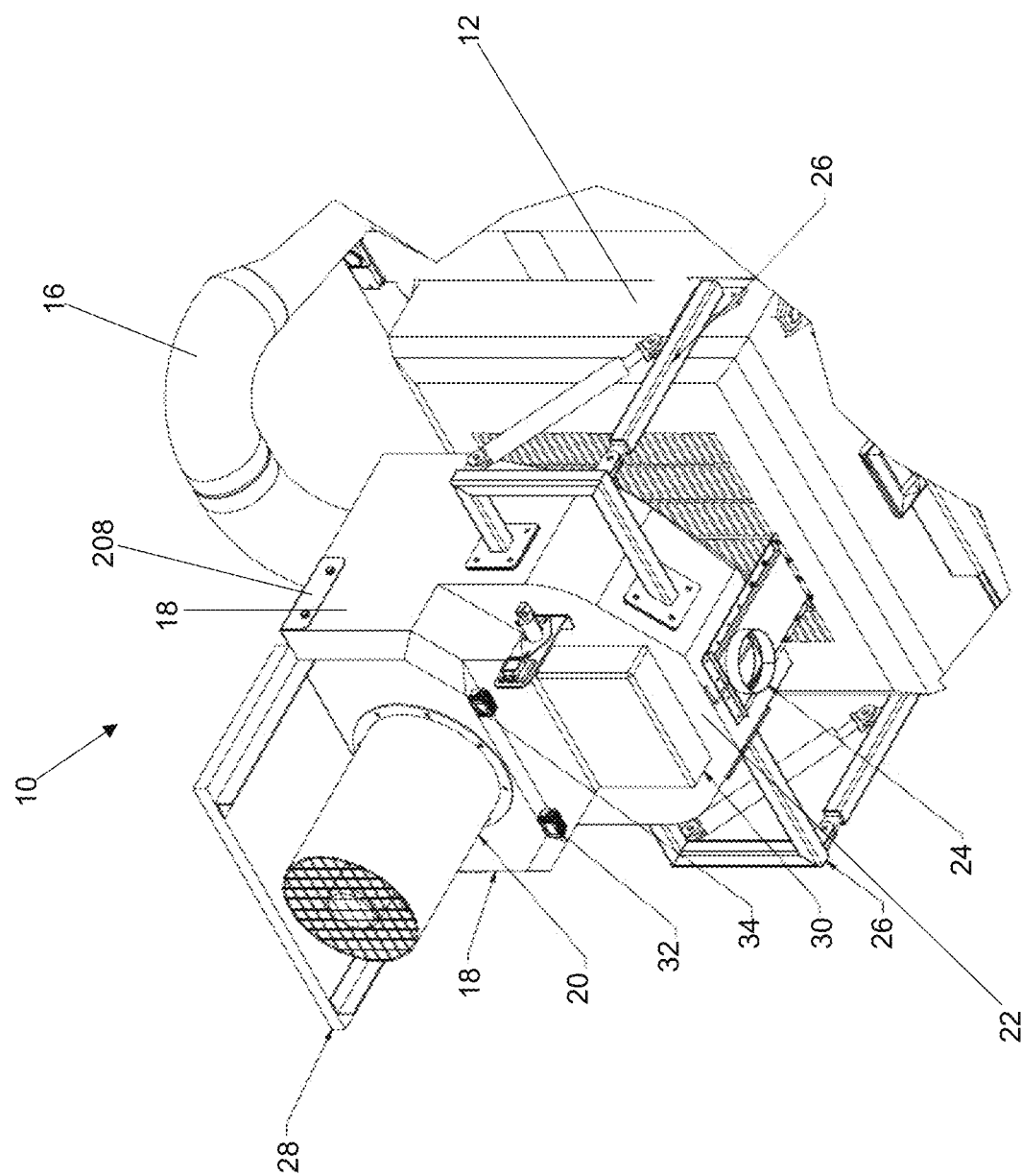
FIG. 4 is a detailed view of part of the dust mitigation system of FIG. 1.
Figure 5:
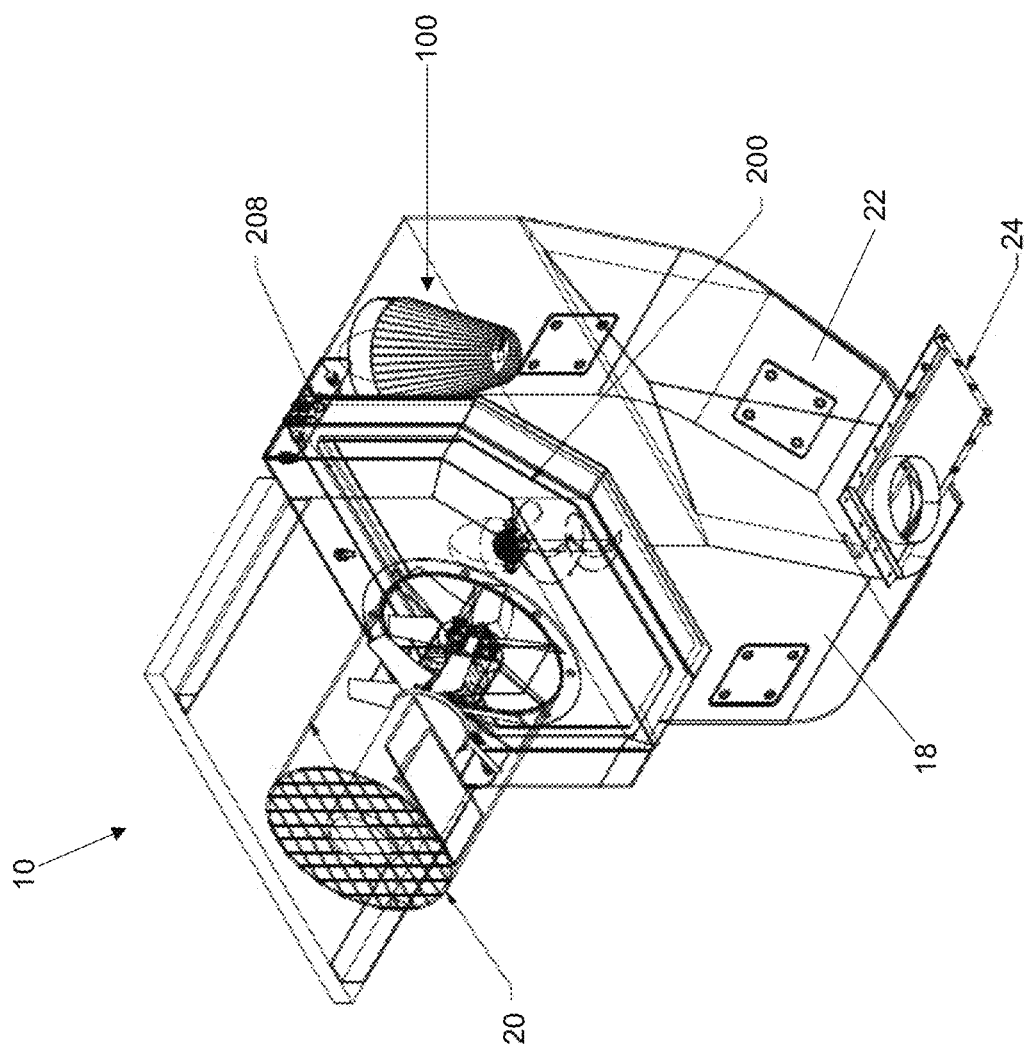
FIG. 5 is a partially transparent view of the dust mitigation system of FIG. 4.
Figure 6:
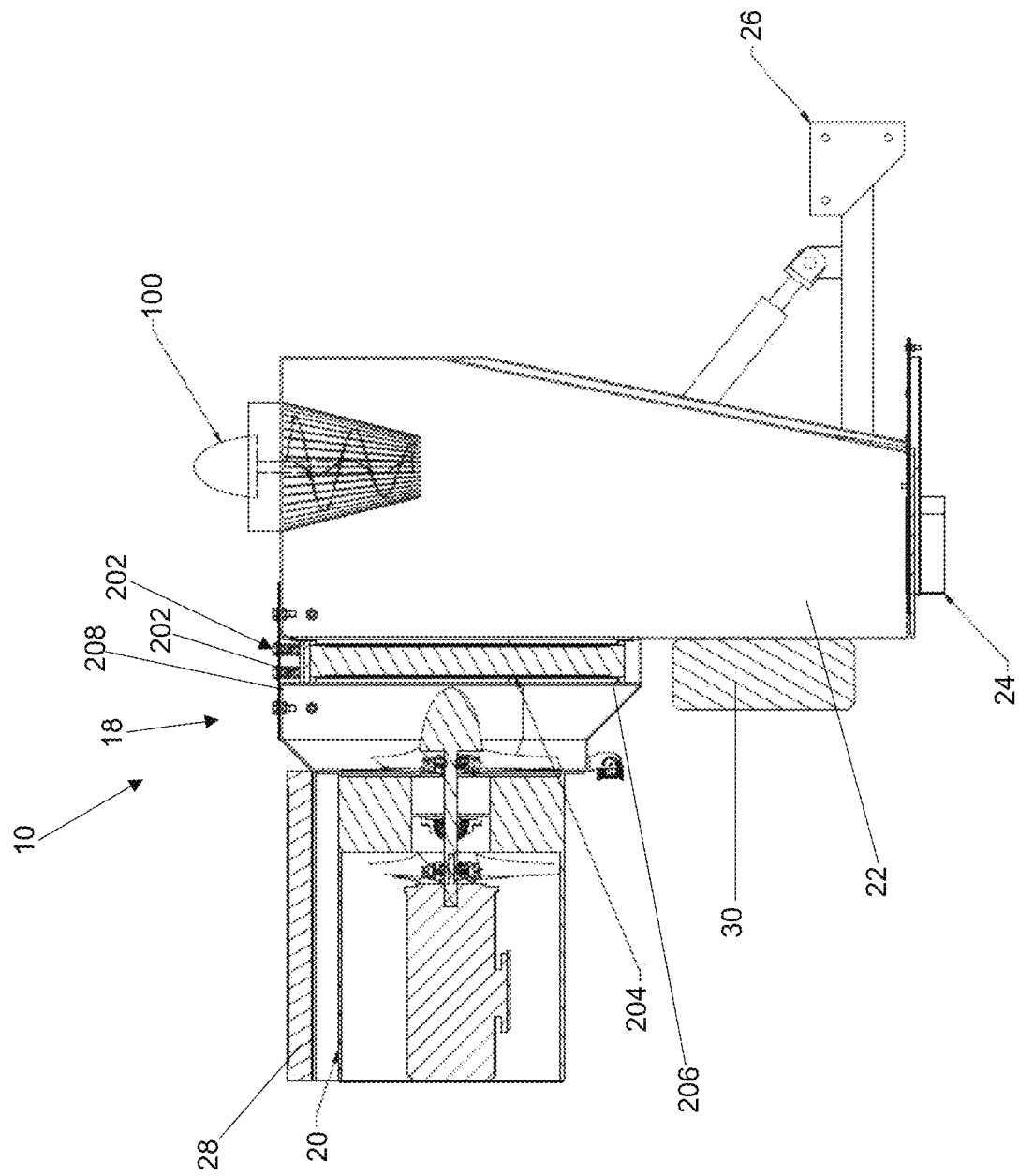
FIG. 6 is a sectioned view of the dust mitigation system of FIG. 4.

With reference to FIGS. 1 to 6 there is shown a dust mitigation system 10 for a mobile sweeper 12. The dust mitigation system 10 has a cover 14. The cover 14 covers brushes (not shown) of the mobile sweeper 12. The dust mitigation system 10 has two ducts 16. The two ducts 16 connect the cover 14 to a dust collector 18.

The dust collector 18 has a fan 20. The fan 20 is an axial fan which moves air through the dust mitigation system 10. The dust collector 18 also has a filter 200. The filter 200 is mounted relative to the dust collector 18 by springs 202. The springs 202 springs enable movement during operation to shake the filter 200 to dislodge any dust or debris that may be stuck in or blocking the filter 200.

The filter 200 includes a panel filter 204. The panel filter 204 is surrounded by a frame 206 (best seen in FIG. 9). The frame 206 creates a seal between the frame 206 and the dust collector 18 to ensure that the air travels through the filter panel 204. The panel filter 204 is inserted into the frame 206 and secured with locking pins 210.

The filter 200 includes a cover plate 208. The cover plate secures the filter 200 to the dust collector 18.

Figures 7, 8:
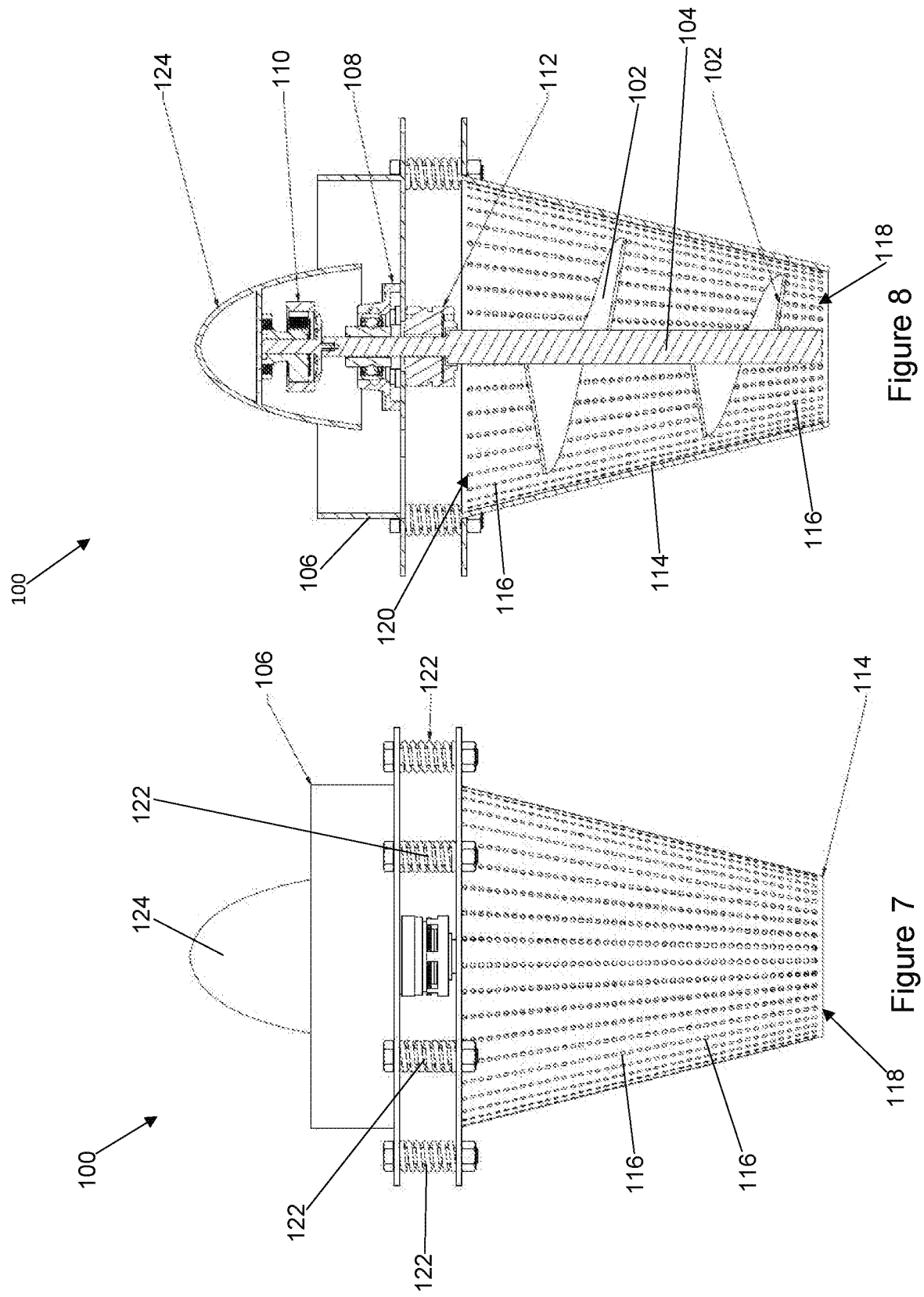
FIG. 7 is a side view of the separator of FIG. 6.
FIG. 8 is a sectioned view of the separator of FIG. 6.

The dust collector 18 also includes two separators 100. Each separator 100 (best seen in FIG. 7 and FIG. 8) has a blade 102 to move air through the separator 100. The blade 102 is attached to a shaft 104. The shaft 104 is rotatably mounted to an inlet 106 via a bearing 108. The shaft is driven by an electric motor 110, and further controlled by a magnetic clutch 112.

A pre-filter 114 is located around the blade 102. The pre-filter 114 has a plurality of openings 116 to enable dust and/or debris below a predetermined size to pass through the plurality of openings 116. The pre-filter 114 has an exhaust aperture 118 for larger particles to exit the pre-filter 114. The pre-filter 114 tapers from an inlet 120 of the pre-filter 114 to the exhaust aperture 118.

The pre-filter 114 is mounted to the inlet 106 by springs 122. The springs 122 enable movement of the pre-filter 114 to dislodge any dust or debris that may be stuck in or blocking the plurality of openings 116. The inlet 106 is mounted to the dust collector and fluidly connected to a corresponding duct 16.

The pre-filter 114 includes an impact protection cone 124. The impact protection cone 124 is fixedly attached to the inlet 106. The impact protection cone 124 protects the motor 110, the bearing 108 and the clutch 112 from incoming dust and debris.

The separators 100 can be driven to move air through the dust mitigation system 10 and to aid the fan 20 when the dust mitigation system 10 starts up. When the dust mitigation system 10 is up and running, the electric motors 110 of the separators 100 can be turned off, and the fan 20 can drive the blades 102.

The dust collector 18 includes a hopper portion 22 to store the dust and debris which settles from the separators 100 and the filter 200. The dust collector 18 has a discharge port in the form of a slide gate 24. The slide gate can be opened to remove the settled dust and debris.

The dust mitigation system 10 includes a support frame 26 to attach the dust collector 18 to the mobile sweeper 12.

The dust mitigation system 10 includes a solar panel 28 to charge a deep cycle battery 30.

The dust mitigation system 10 includes a reverse camera 32. The reverse camera enables an operator to see behind the mobile sweeper 12.

The dust mitigation system 10 includes a flood light 34 to illuminate the area behind the dust collector 18.

The mobile sweeper 12 has two arms 36 which can move the cover 14.

Advantages

An advantage of the preferred embodiment of the dust mitigation system includes that the separator can increase the duct speed which takes a load off the main fan. Another advantage of the preferred embodiment of the dust mitigation system includes that the separator enables a higher filtration velocity as less dust is directed towards the filter. A further advantage of the preferred embodiment of the dust mitigation system includes that the separator acts as an inline separator and fan in a single component. Another advantage of the preferred embodiment of the dust mitigation system includes that the separator reduces the load requirement of the fan when the dust mitigation system starts up. A further advantage of the preferred embodiment of the dust mitigation system includes that the separator reduces the footprint of dust collector as less filter area is required. Another advantage of the preferred embodiment of the dust mitigation system includes that the filter frame ensures alignment of filter during service and when new filter is required. A further advantage of the preferred embodiment of the dust mitigation system includes that the vibration of the filter during operation ensures dust build up is reduced, this also reduces load on main fan and increases filter life. Another advantage of the preferred embodiment of the dust mitigation system includes that the filter seal system enables pack pressure to be used on the filter to clean it out without the filter becoming dislodged.

Variations

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A dust mitigation system for a mobile sweeper, the dust mitigation system including; a cover to at least partially cover one or more brushes of the mobile sweeper; a dust collector including: at least one fan; and one or more filters; at least one duct fluidly connecting the cover with the dust collector; and at least one separator for separating dust and/or debris from air, the at least one separator including: one or more blades to move the air through the at least one separator; and a pre-filter located at least partially around the one or more blades, the pre-filter having a plurality of openings to enable dust and/or debris below a predetermined size to pass through the plurality of openings, and an exhaust aperture for larger particles to exit the pre-filter, the pre-filter tapered from an inlet of the pre-filter to the exhaust aperture.

2. A dust mitigation system as claimed in claim 1, wherein the at least one separator is two separators.

3. A dust mitigation system as claimed in claim 1, wherein the at least one separator includes a motor to drive the one or more blades.

4. A dust mitigation system as claimed in claim 3, wherein the at least one separator includes a clutch to disengage the one or more blades relative to the motor.

5. A dust mitigation system as claimed in claim 4, wherein the clutch is a magnetic clutch.

6. A dust mitigation system as claimed in claim 3, wherein the motor is adapted to act as a clutch, enabling the one or more blades to spin without powering the motor.

7. A dust mitigation system as claimed in claim 1, wherein the one or more filters is a panel filter mounted to a part of the dust collector by one or more resilient or elastic members adapted to enable movement during operation of the dust mitigation system to shake the filter to dislodge any dust or debris that may be stuck in or blocking the filter.

8. A dust mitigation system as claimed in claim 1, wherein the at least one duct is two ducts.

9. A dust mitigation system as claimed in claim 1, wherein the pre-filter is mounted to a portion of the separator by one or more resilient or elastic members adapted to enable movement during operation of the separator to shake the pre-filter to dislodge any dust or debris that may be stuck in or blocking the plurality of openings.

10. A dust mitigation system as claimed in claim 9, wherein the one or more resilient or elastic members are one or more springs.

11. A dust mitigation system as claimed in claim 1, wherein each of the one or more filters is a panel filter, each panel filter having a filter;
a frame surrounding the filter;
one or more resilient or elastic members to mount the frame to a dust collector,
wherein the one or more resilient or elastic members are adapted to enable movement during operation of the dust collector to shake the filter to dislodge any dust or debris that may be stuck in or blocking the filter.

12. A dust mitigation system as claimed in claim 11, wherein the one or more resilient or elastic members are one or more springs.

13. A mobile sweeper including a dust mitigation system as claimed in claim 1.

14. A panel filter for filtering dust or debris from air, the panel filter having: a filter; a frame surrounding the filter; one or more resilient or elastic members to mount the frame to a dust collector, wherein the one or more resilient or elastic members are adapted to enable movement during operation of the dust collector to shake the filter to dislodge any dust or debris that may be stuck in or blocking the filter; wherein the panel filter is installable in a dust collector of a dust mitigation system, the dust mitigation system including: at least one fan; at least one duct fluidly connecting the cover with the dust collector; and at least one separator for separating dust and/or debris from air, the at least one separator including: one or more blades to move the air through the at least one separator; and a pre-filter located at least partially around the one or more blades, the pre-filter having a plurality of openings to enable dust and/or debris below a predetermined size to pass through the plurality of openings, and an exhaust aperture for larger particles to exit the pre-filter, the pre-filter tapered from an inlet of the pre-filter to the exhaust aperture.

15. A panel filter as claimed in claim 14, wherein the filter includes one or more seals to seal against a portion of the dust collector to ensure that the air passes through the filter.

16. A method of filtering air, including the steps of: sweeping a ground surface with a mobile sweeper; moving air with swept dust and/or debris through at least one separator having a pre-filter to separate different sized dust and/or debris; moving the air through a filter to filter the air; and shaking the pre-filter and the filter to dislodge dust and/or debris such that the dust and debris can fall into a hopper; wherein the at least one separator includes: one or more blades to move the air through the at least one separator; and a pre-filter located at least partially around the one or more blades, the pre-filter having a plurality of openings to enable dust and/or debris below a predetermined size to pass through the plurality of openings, and an exhaust aperture for larger particles to exit the pre-filter, the pre-filter tapered from an inlet of the pre-filter to the exhaust aperture.

17. A method as claimed in claim 16, wherein the air is moved by at least one fan, and the at least one separator includes one or more blades to move air through the separator.

* * * * *